United States Patent [19]

Tekelly et al.

[11] Patent Number: 5,584,509
[45] Date of Patent: Dec. 17, 1996

[54] ENERGY ABSORBING BOLSTER ASSEMBLY

[75] Inventors: Joseph P. Tekelly, Troy; James M. Hanford, Dearborn; Garry J. Schleicher, Manchester; Jeffrey L. Laya, Northville; Ming T. Loo, Dearborn; Laike Misikir, Southfield, all of Mich.

[73] Assignee: Ford Motor Company, Dearborn, Mich.

[21] Appl. No.: 489,571

[22] Filed: Jun. 12, 1995

[51] Int. Cl.⁶ .................................................. B60R 21/05
[52] U.S. Cl. ........................................ 280/750; 280/752
[58] Field of Search .................................. 280/750, 751, 280/752, 748, 777, 779, 780; 296/70, 189, 194; 188/371, 377; 180/90

[56] References Cited

U.S. PATENT DOCUMENTS

| | | | |
|---|---|---|---|
| 3,907,326 | 9/1975 | Arntson et al. | 280/752 |
| 3,964,578 | 6/1976 | Campbell et al. | 280/752 |
| 4,317,582 | 3/1982 | Cottin et al. | 280/751 |
| 4,383,704 | 5/1983 | Yoshitsugu | 280/750 |
| 4,709,943 | 12/1987 | Yoshimura et al. | 280/751 |
| 4,773,674 | 9/1988 | Wierschem | 280/777 |
| 4,946,192 | 8/1990 | Kuwahara | 280/751 |
| 4,978,138 | 12/1990 | Hikone et al. | 280/777 |
| 5,037,130 | 8/1991 | Okuyama | 280/752 |
| 5,071,162 | 12/1991 | Takagawa | 280/752 |
| 5,085,467 | 2/1992 | Converse | 280/777 |
| 5,096,223 | 3/1992 | Tekelly et al. | 280/751 |

FOREIGN PATENT DOCUMENTS

| | | | |
|---|---|---|---|
| 1-47641 | 2/1989 | Japan | 280/750 |
| 6-183306 | 7/1994 | Japan | 280/751 |

*Primary Examiner*—Kevin Hurley
*Assistant Examiner*—Peter C. English
*Attorney, Agent, or Firm*—Daniel M. Stock

[57] ABSTRACT

An energy absorbing bolster (32) is provided for attachment to downward facing surfaces of an energy absorbing steering column support bracket (24). The bolster (32) includes longitudinally spaced mounting flanges (40, 42) for securement to the support bracket (24) and a energy absorbing linkage (44) arranged between the mounting flanges, the linkage taking the form of front and rear carrier portions (64, 46), depending from the support bracket and a bridge portion (66), and a load transfer portion (68) arranged between them.

13 Claims, 1 Drawing Sheet

5,584,509

ENERGY ABSORBING BOLSTER ASSEMBLY

BACKGROUND OF THE INVENTION

1. Field of the Invention

The present invention relates generally to automotive vehicle occupant restraint systems, and more specifically to knee bolsters of the type employed in vehicles having occupant restraint systems.

2. Prior Art

It is known in the prior art to design the structure of the lower portion of an automotive vehicle instrument panel to present a restraining surface in juxtaposition with the knees of a seated occupant. Certain of such structures employ a strengthening bar or the like in such a position.

The automotive industry has given great attention to the design of automobile interiors to provide energy absorbing structure forward the seated front seat occupants for managing loads imposed forwardly with respect to the vehicle during emergency conditions. Many of the components carried within the interior of a vehicle are passive devices. Among these devices are the steering column and the bracketry through which the steering column is attached to the vehicle body. A certain amount of energy absorbing stroking is often provided in the steering column and the bracketry, while grounded in the vehicle body, is specially designed to accommodate the stroking. In addition, cushioning structure is generally provided in the instrument panel, the steering wheel, and associated components within the vehicle body. These components, and others, such as air bags and seat belts, make up interior parts of the vehicle occupant restraint system.

It is desirable to enhance the energy absorbing capability of an overall occupant restraint system by ancillary structures, such as knee bolsters, which supplement the overall energy absorbing characteristic of a given automobile construction.

For some vehicle bodies, a relatively stiff resistance from the knee bolster is employed. It has been desired to provide greater compliance in bolster resistance in some vehicles, however. It has also been desired to provide a knee bolster configuration that is suitable for cooperation with the bracketry associated with mounting energy absorbing steering columns. The prior art bolsters have not provided these desired capabilities.

SUMMARY OF THE INVENTION

These capabilities are provided in an energy absorbing bolster assembly according to the present invention which cooperates with support brackets secured to a beam carried in the instrument panel of a vehicle by providing longitudinally spaced flange connections for attaching a box-like energy absorbing linkage approximating a four-bar linkage, hereafter referred to as an energy absorbing linkage depending downwardly from the support bracket to absorb energy in response to frontwardly directed loading.

According to one aspect of the present invention, the energy absorbing linkage includes a generally U-shaped rear carrier having flanges mounted to the support bracket, and a pair of laterally spaced generally U-shaped load transfer links also having a flange mounted to the support bracket at one end of each of them and each having another end secured to a laterally extending generally horizontal load bar of the U-shaped rear carrier.

According to another aspect of the present invention, the carrier is formed as a U-shaped tubular member having flattened ends for forming mounting flanges for securement to the support bracket.

BRIEF DESCRIPTION OF THE DRAWINGS

These and other advantages of the present invention will become apparent to those skilled in the automotive occupant restraint arts by reading the following description with reference to the accompanying drawing, in which.

DESCRIPTION OF THE PREFERRED EMBODIMENT

Figure 1:
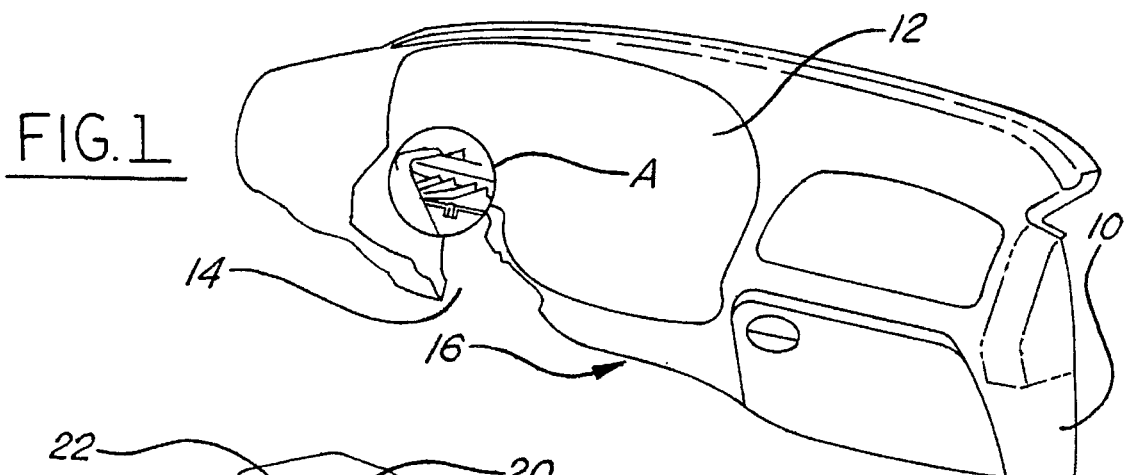
FIG. 1 is a perspective view of a portion of an automotive vehicle instrument panel illustrating the area in which a steering column is mounted.

Turning now to the drawings, and in particular to FIG. 1 thereof, an automotive instrument panel assembly, indicated generally at 10, is illustrated as including an instrument cluster area 12 having a notch 14 proximate the bottom, indicated generally at 16, of the instrument panel assembly 10 for receiving a steering column in a known manner. The arrangement of such an instrument panel within a vehicle at the forward end of the vehicle passenger compartment and extending laterally within the vehicle is well known to those skilled in the automotive body arts.

The circled portion, designated A in FIG. 1, shows the area in which bracketry for mounting the steering column is assembled to the instrument panel structure in the design of automotive vehicle bodies, it is well known to provide a beam running laterally of the vehicle over at least a portion of its width. The beam design illustrated in the present embodiment of the instrument panel assembly 10 includes a beam 18 that is illustrated as being built-in at one end 20 to a portion of the vehicle body 22. Details of the design of the beam 18 itself do not form a necessary part of the present invention, except that the beam 18 extends laterally of the vehicle within the laterally extending instrument panel assembly 10.

Figure 2:
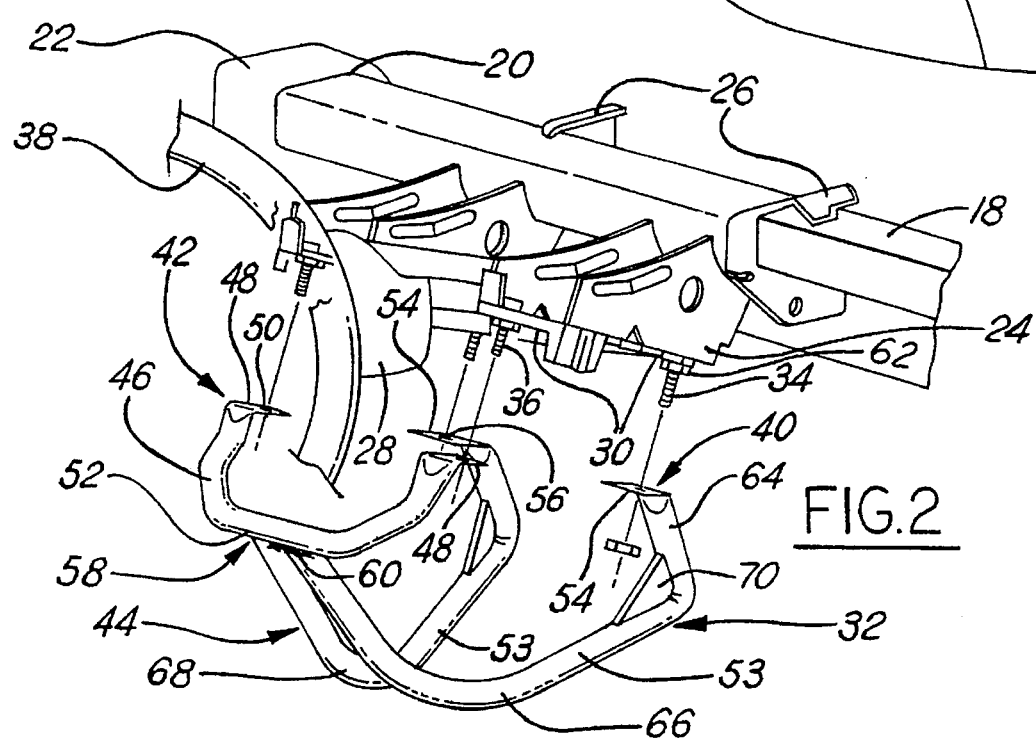
FIG. 2 is an enlarged exploded view of the steering column mounting portion of the instrument panel assembly designated by the circled area A in FIG. 1 illustrating the assembly of the invention energy absorbing bolster assembly.
Figure 3:
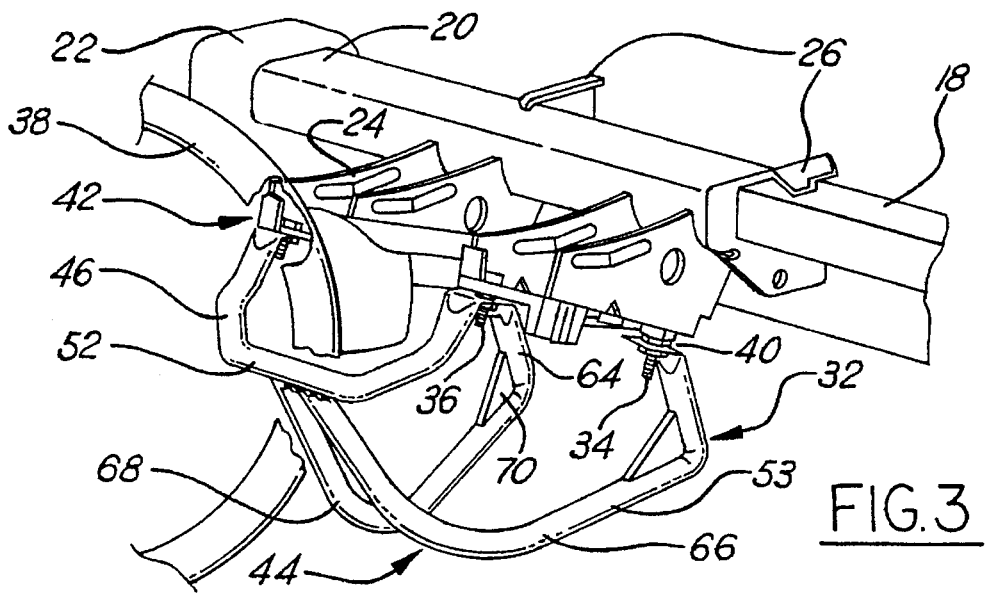
FIG. 3 is a view similar to FIG. 2 showing the bolster assembly in assembled position.

Turning next to FIGS. 2 and 3, a steering column support bracket 24 is illustrated as being fixedly secured as by clamp portions 26 to the beam 18. The design of the support bracket 24 is also arranged to supportingly receive a steering column, indicated generally at 28, in a known manner, and to present generally downwardly facing mounting surfaces, as indicated at 30.

As may best be seen in FIG. 2, it is from the mounting surfaces 30 that the bolster assembly of the present invention, indicated generally at 32, depends from the support bracket 24 for absorbing energy upon the imposition of loads generally forwardly of the vehicle, that is, towards the instrument panel assembly 10. The mounting surfaces 30 are arranged as longitudinally spaced pairs of fasteners, such as studs, indicated at 34, 36. As can best be seen in FIG. 2, the forward pair of fasteners 34 is arranged proximate the position of beam 18 and the rearward pair of fasteners 36 is positioned closer to a wheel portion 38 of the steering column 28.

The bolster assembly 32 is illustrated as including a front mounting flange, indicated generally at 40, a rear mounting flange, indicated generally at 42, and a energy absorbing linkage, indicated generally at 44. In the preferred embodiment shown, the energy absorbing linkage is illustrated as comprising a rear carrier member 46 formed as a generally U-shaped tubular member having flattened end portions 48 for forming the mounting flange 42 as a pair of laterally spaced mounting flanges having apertures 50 for receiving the rear studs 36. The carrier member 46 is carried in cantilever fashion with respect to the support bracket 24 and extends generally downwardly and rearwardly therefrom to present the generally horizontal load bar portion 52 toward a driver seated rearwardly of the wheel 38.

The energy absorbing linkage 44 also includes a pair of laterally spaced, generally U-shaped load transfer links 53, each also formed as a tubular member being flattened over at end portions 54 for forming the front mounting flange 40 of the energy absorbing bolster assembly 32, defining in this embodiment a pair of laterally spaced mounting flanges pierced by apertures 56 for receiving the forward mounting studs 34. The other end 58 of each of the load transfer links 53 is fixedly secured as by welding, indicated at 60, to the load bar 52 of the carrier member 46. The load transfer links 53 may also be held together laterally, as by strapping or bracketry extending between them.

It can also be seen in FIGS. 2 and 3 that nuts 62 cooperate with the studs 34, 36 to secure the bolster assembly 32 to the support surfaces 30 of the support bracket 24.

The load transfer links 53 each have a generally vertically depending carrier portion indicated generally at 64, generally horizontal bridge portions 66, and a canted load transfer portion 68 extending generally upwardly and rearwardly to the point of juncture with the load bar 52. A reinforcing gusset, indicated at 70, is fixedly secured between the front carrier portion 64 and the bridge portion 66.

In operation, during the imposition of high loads forwardly of the vehicle, that is, toward the instrument panel assembly 10, loads imposed on the load bar 52 and/or the load transfer portion 68 must operate to pivot the rear carrier 46 about the mounting surface 30. The transfer of portions of that load through the bridge portion 66 to the front carrier 64 can, in response to loads in certain directions, produce pivotal moments about the front studs 34. Thus, the overall energy absorbing characteristic of the bolster assembly 32 is enhanced by the linkage between the two cantilevered carriers, that is, the rear carrier 46 and the front carrier formed by the two laterally spaced carrier links 64. The positioning of the connection between the load bar 52 and the load transfer member 68 near the midpoint of the load bar 52 and spaced laterally inwardly with respect to the front studs 34 has been found to be useful in maintaining the integrity of the energy absorbing linkage 44 in certain applications because the structure does not define a four-bar linkage in planes normal to the steering column and the inward cant resists matchboxing.

While only one embodiment of the bolster assembly of the present invention has been shown and described, others may occur to those skilled in the automotive body arts without departing from the scope of the appended claims. Such modifications may include inter alia using other than tubular construction for the members of the bolster and the provision of mounting arrangements for the carrier portions of the bolster which provide for other than the two pairs of laterally spaced mounting flanges illustrated.

What is claimed is:

1. An energy absorbing bolster assembly for an automotive vehicle having an instrument panel, a laterally extending beam carried within the instrument panel, a steering column, and a support bracket secured to the beam and supportively engaging the steering column and having generally downwardly facing mounting surfaces, the bolster assembly comprising:

at least one front flange fixedly secured to at least one of said support bracket mounting surfaces;

at least one rear flange fixedly secured to at least one of said support bracket mounting surfaces and positioned longitudinally rearwardly of said at least one front flange; and an energy absorbing linkage operatively engaged between said at least one front flange and said at least one rear flange, and depending downwardly therefrom to absorb energy in response to the imposition of frontwardly directed loading.

2. An energy absorbing bolster assembly as defined in claim 1, wherein said energy absorbing linkage comprises:

a front carrier having one end fixedly secured to said at least one front flange and depending generally vertically downwardly from said at least one front flange in cantilever fashion and another end;

a rear carrier extending in cantilever fashion generally downwardly and rearwardly from said at least one rear flange;

a bridge member fixedly secured to the other end of the front carrier remote from said at least one front flange; and a load transfer member having a first end secured to said rear carrier extending downwardly and forwardly therefrom and having a second end secured to said bridge member.

3. An energy absorbing bolster assembly as defined in claim 2, and further comprising a reinforcement fixedly secured between said front carrier and said bridge member arranged to resist bending movement between said front carrier and said bridge member in response to the imposition of a forwardly directed load.

4. An energy absorbing bolster assembly as defined in claim 1, wherein said at least one front flange comprises a pair of laterally spaced front mounting flanges and said at least one rear flange comprises a pair of laterally spaced rear mounting flanges, and wherein said energy absorbing linkage comprises:

a generally U-shaped rear carrier extending between said rear mounting flanges and connected thereto and depending therefrom in cantilever fashion and having a laterally extending, generally horizontal load bar portion positioned generally below and rearwardly from said rear mounting flanges; and a pair of laterally spaced, generally U-shaped load transfer links, each having one end secured to one of said front mounting flanges and another end secured to said rear carrier load bar portion.

5. An energy absorbing bolster assembly as defined in claim 4, wherein each of said load transfer link other ends is displaced laterally inwardly from its respective one end.

6. An energy absorbing bolster assembly as defined in claim 4, wherein said rear carrier comprises a U-shaped tube, and wherein said rear mounting flanges comprise a flattened portion formed adjacent the ends of said tube.

7. An energy absorbing bolster assembly as defined in claim 6, whereto said load transfer links each comprises a U-shaped tube, comprising a flattened portion at the one end thereof to define said front mounting flanges.

8. An energy absorbing bolster assembly as defined in claim 4, wherein said load transfer links each comprise a U-shaped tube, comprising a flattened portion at the one end thereof to define said front mounting flanges.

9. An energy absorbing bolster assembly, comprising: an automotive steering column support bracket extending longitudinally of the vehicle and defining front and rear ends;

a generally U-shaped rear carrier mounted proximate the rear end of the support bracket and depending therefrom in cantilever fashion, and defining a laterally extending, generally horizontal load bar portion positioned generally below and rearwardly from the support bracket; and a pair of laterally spaced, generally U-shaped load transfer links, each having one end secured to the support bracket proximate its front end and another end secured to said rear carrier load bar portion.

10. An energy absorbing bolster assembly as defined in claim 9, wherein each of said load transfer link other ends is displaced laterally inwardly from its respective one end.

11. An energy absorbing bolster assembly as defined in claim 9, wherein said rear carrier comprises a U-shaped tube comprising a flattened portion formed adjacent the ends of said tube to define rear mounting flanges.

12. An energy absorbing bolster assembly as defined in claim 11, wherein said load transfer links each comprises a U-shaped tube, comprising a flattened portion at the one end thereof to define front mounting flanges.

13. An energy absorbing bolster assembly as defined in claim 9, wherein said load transfer links each comprises a U-shaped tube, comprising a flattened portion at the one end thereof to define front mounting flanges.

* * * * *